(12) United States Patent
Cheng et al.

(10) Patent No.: US 10,972,556 B1
(45) Date of Patent: *Apr. 6, 2021

(54) LOCATION-BASED FUNCTIONALITY FOR VOICE-CAPTURING DEVICES

(71) Applicant: Amazon Technologies, Inc., Seattle, WA (US)

(72) Inventors: Yu-Hsiang Cheng, Bothell, WA (US); Ruoyu Fei, Kirkland, WA (US); Jingyu Ji, Seattle, WA (US); Milo Oostergo, Issaquah, WA (US); Aapo Juhani Laitinen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 391 days.

This patent is subject to a terminal disclaimer.

(21) Appl. No.: 15/466,736

(22) Filed: Mar. 22, 2017

(51) Int. Cl.
*H04L 29/08* (2006.01)
*G10L 15/22* (2006.01)
*G10L 15/30* (2013.01)

(52) U.S. Cl.
CPC .............. *H04L 67/18* (2013.01); *G10L 15/22* (2013.01); *G10L 15/30* (2013.01); *G10L 2015/223* (2013.01)

(58) Field of Classification Search
CPC ......... H04L 67/18; H04L 67/20; H04L 67/22; H04L 12/2803; G10L 15/22; G10L 15/30;
(Continued)

(56) References Cited

U.S. PATENT DOCUMENTS 6,654,720 B1 * 11/2003 Graham ..................... G06F 3/16
704/270
7,286,834 B2 * 10/2007 Walter ............ H04W 12/00503
455/456.1

(Continued)

FOREIGN PATENT DOCUMENTS

EP 2113909 B1 * 1/2015 ............. G06Q 10/06

OTHER PUBLICATIONS

Grant Clouser, "What is Alexa? What is the Amazon Echo, and Should You Get One?", TheWirecutter.com, Feb. 10, 2017. Retrieved from: http://thewirecutter.com/reviews/what-is-alexa-what-is-the-amazon-echo-and-should-you-get-one/, pp. 1-18.
(Continued)

*Primary Examiner* — Glenton B Burgess
*Assistant Examiner* — Rachel J Hackenberg
(74) *Attorney, Agent, or Firm* — Robert C. Kowert; Kowert, Hood, Munyon, Rankin & Goetzel, P.C.

(57) ABSTRACT

Methods, systems, and computer-readable media for location-based functionality for voice-capturing devices are disclosed. An association is determined between a location value for a location parameter and one or more functionalities. The association is stored by a device management component of a service provider environment. An assignment of the location value to a device account is stored by the device management component. The device account corresponds to a voice-capturing device coupled to the service provider environment over one or more networks. Based at least in part on the assignment of the location value to the device account, the one or more functionalities are enabled for use by the voice-capturing device.

20 Claims, 9 Drawing Sheets

(58) Field of Classification Search
CPC ... G10L 15/24; G10L 15/00; G10L 2015/223; G10L 2015/226; G10L 17/06; G10L 17/22; G10L 25/51; H04W 4/02; H04W 4/21; H04W 4/029; H04W 12/08; H04W 8/02

See application file for complete search history.

(56) References Cited

U.S. PATENT DOCUMENTS

| | | | |
|---|---|---|---|
| 8,515,843 B1 | 8/2013 | Sah et al. | |
| 8,655,761 B2 | 2/2014 | Sah et al. | |
| 9,319,409 B2 | 4/2016 | Pollock | |
| 9,355,555 B2 | 5/2016 | Reichert et al. | |
| 9,357,385 B2 | 5/2016 | Benoit et al. | |
| 9,520,250 B2 | 12/2016 | O'Keeffe | |
| 9,521,642 B2 | 12/2016 | Benoit et al. | |
| 9,736,089 B2 * | 8/2017 | Chen | H04L 51/10 |
| 2015/0162006 A1 * | 6/2015 | Kummer | G07C 9/00571 |
| | | | 704/275 |
| 2015/0213355 A1 * | 7/2015 | Sharma | G06N 3/006 |
| | | | 706/11 |
| 2016/0036764 A1 * | 2/2016 | Dong | H04L 61/3025 |
| | | | 370/254 |
| 2016/0077791 A1 | 3/2016 | Gossain et al. | |
| 2016/0100206 A1 | 4/2016 | Beckhardt et al. | |
| 2016/0105418 A1 | 4/2016 | Zhang et al. | |
| 2016/0088438 A1 | 5/2016 | O'Keeffe | |
| 2016/0180222 A1 | 6/2016 | Sierhuis et al. | |
| 2016/0182513 A1 | 6/2016 | Pollock | |
| 2016/0284207 A1 | 9/2016 | Hou et al. | |
| 2016/0309246 A1 | 10/2016 | O'Keeffe | |
| 2017/0040018 A1 | 2/2017 | Tormey | |
| 2017/0055126 A1 | 2/2017 | O'Keeffe | |
| 2017/0126509 A1 * | 5/2017 | Jones-McFadden | H04L 41/22 |

OTHER PUBLICATIONS

U.S. Appl. No. 15/456,097, filed Mar. 13, 2017, Jones, et al.
U.S. Appl. No. 15/456,750, filed Mar. 13, 2017, Raje, et al.

* cited by examiner

LOCATION-BASED FUNCTIONALITY FOR VOICE-CAPTURING DEVICES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed system may provide remote clients with access to various services that are implemented largely within the distributed system and that are accessible via a network such as the Internet. Such services may be said to reside "in the cloud." The types of devices that can access cloud-based services continue to expand and diversify, including, for example, desktop computing devices, mobile devices such as smartphones and tablets, voice-capturing devices, home automation devices, and various other types of network-capable devices that are part of the "Internet of Things (IoT)." By accessing cloud-based services, a diverse universe of devices may access additional functionality or computing power not available locally on the devices.

Figure 1A:
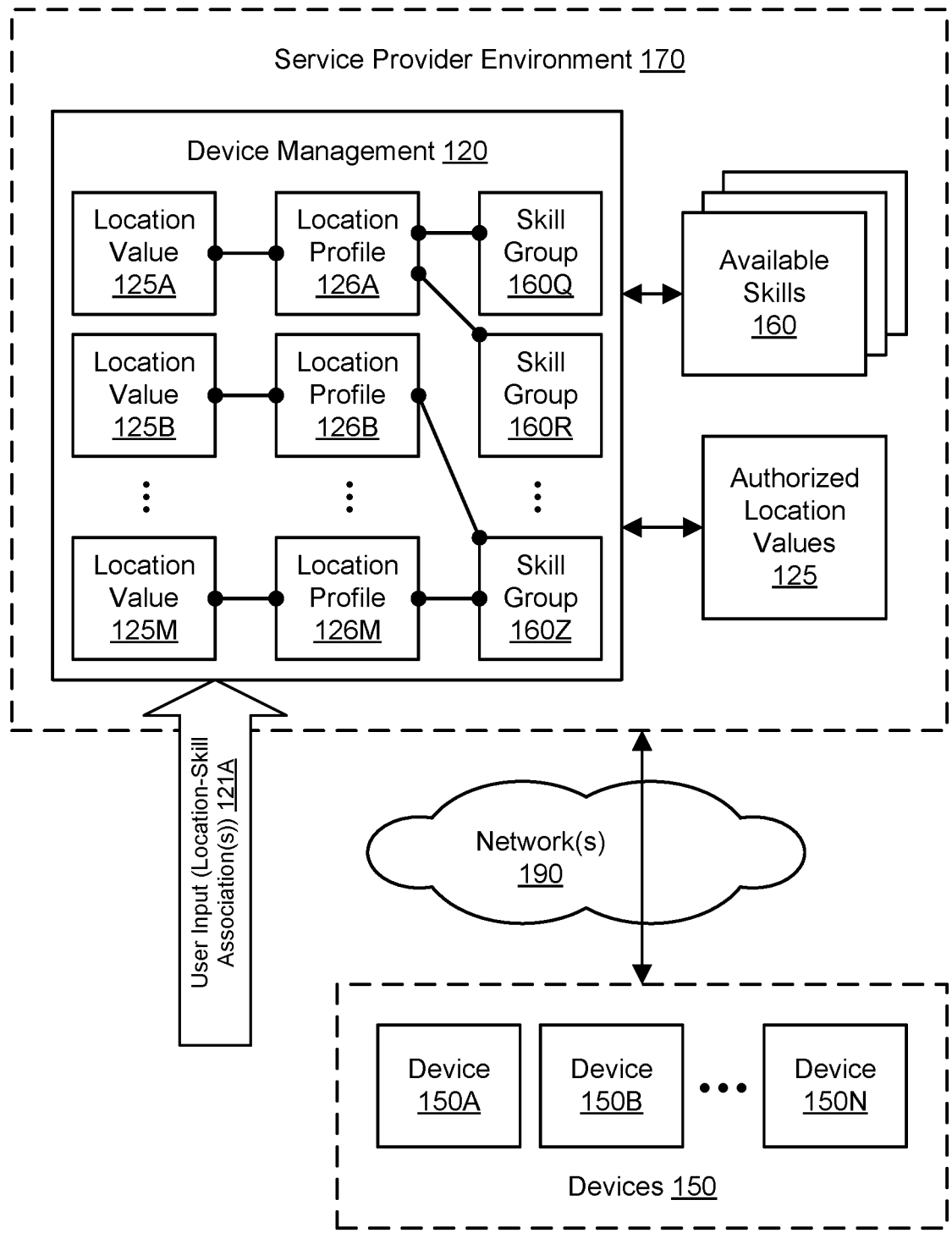
FIG. 1A illustrates an example system environment for location-based functionality for voice-capturing devices, including associating locations with skill groups via location-specific profiles, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for location-based functionality for voice-capturing devices are disclosed. Using the techniques described herein, specific functionality may be enabled for devices based (at least in part) on the locations of those devices. Suitable devices may include desktop and laptop computing devices, smartphones, tablets, voice-capturing devices such as smart speakers, and/or other "Internet of Things" (IoT) devices. An administrator or other user may provide input to associate particular rooms, areas, or other defined locations with particular groups of functionalities or skills, e.g., via a location-specific profile or location-specific criteria. The skills may be offered to devices by a service provider environment to implement particular tasks requested by the devices. A device may be associated with a device-specific account in the service provider environment, e.g., as maintained by a device management component. The device account may be associated with a location value that represents a real-world location of the corresponding device, such as a particular room within a particular building. Based (at least in part) on the location of the device and on the skills associated with that location, a set of skills in the service provider environment may be enabled for the device. The skills may vary based on the location of the device. For example, in a hotel environment, a standard hotel room may be associated with fewer skills than an executive suite (e.g., adding a concierge service to a standard skill group), and a front desk or customer service kiosk may be associated with different skills than a hotel room. When a device is added to one of these locations, the device may be automatically granted access to the particular skills associated with the particular location. If a device is moved to a new location, then any skills associated with the old location but not the new location may be disabled for the device. If the skill group or profile for a location is modified, then the enabled skills for any devices in that location may also be modified automatically rather than manually and individually for each of the devices. In this manner, configuration of functionality accessible to devices may be performed with greater efficiency and flexibility.

FIG. 1A illustrates an example system environment for location-based functionality for voice-capturing devices, including associating locations with skill groups via location-specific profiles, according to one embodiment. A service provider environment 170 may include a device management component 120 that performs configuration and/or account maintenance tasks related to a set of devices 150. The service provider environment 170 may include various components that are owned or managed by one or more entities or organizations called service providers. The components of the service provider environment 170 may be located in one or more data centers and in one or more geographical locations. The service provider environment 170 may also include and/or provide access to a plurality of services or other components referred to as skills 160. The skills 160 may perform various functions or tasks, often involving interactions with devices 150 outside the service provider environment 170. The skills 160 may be referred to as functionalities. In various embodiments, some of the components of the service provider environment 170 may be accessed by the devices 150 while others of the components may be accessed only by other components and not directly by the devices. Services in the service provider environment 170 may be implemented according to a service-oriented architecture (SOA) in which services exchange requests and responses to perform complex operations. For example, the device management component 120 may be implemented as a service that interacts with one or more voice-based services that analyze and act upon voice input from the devices 150.

As shown for purposes of illustration and example, the devices 150 may include devices 150A and 150B through 150N. In various embodiments, the devices 150 may be heterogeneous or homogeneous in terms of their device type and/or vendor. The devices 150 may include various types of electronic devices, digital devices, and/or computing devices. The devices 150 may include voice-capturing devices or smart speakers as well as other home automation and/or "Internet of Things" devices. In one embodiment, the devices 150 may include wireless and/or wired networking interfaces for accessing Wi-Fi and/or other suitable wireless and/or wired networks. The devices may be configurable to access one or more resources and/or services provided by the cloud-based service provider environment 170. For example, the devices 150 may be capable of accessing the available skills 160 if properly configured, e.g., by the device management component 120.

In one embodiment, the service provider environment 170 may include one or more network-accessible, voice-based services or components. One or more of the devices 150 may include voice-capturing devices (also referred to as voice-capturing endpoints) and/or "smart speakers" that are configurable to stream or send voice input to the network-accessible voice-based service provided by the service provider environment 170. In response, the voice-based service(s) may take one or more actions, such as invoking one or more of the skills 160, and/or stream voice output back to the originating device for playback on that device. The actions and/or voice output may vary based on the skills 160 of the service provider environment 170 that are enabled for the particular device. Skills or functionalities that are responsive to voice input from devices 150 may be referred to as voice-enabled skills or voice-enabled functionalities. In various embodiments, the skills 160 provided by the service provider environment 170 may include, for example, scheduling conference calls; identifying a speaker during a conference call; acting as a scheduling assistant; providing calendaring services, recording a meeting; accessing calendars, phone directories, or e-mail; creating, scheduling, and/or modifying tasks; and so on. In one embodiment, some of the devices 150 may be satellite devices that are configured to connect to a central device over a local area network, e.g., to send voice input to the central device, and the central device may then connect to the service provider environment 170. By accessing cloud-based services of the service provider environment 170, the devices 150 may access additional functionalities 160 or other resources not available locally on the devices.

In one embodiment, the device management component 120 may be used to specify authorized or permissible values for device configuration parameters, e.g., based on user input through a user interface or input through an application programming interface (API). For example, as shown in FIG. 1A, the device management component 120 may access a set of authorized location values 125. The authorized location values 125 may include a set of discrete values, including values 125A and 125B through 125M. For example, the authorized values 125 for a location parameter may include a set of named locations, such as rooms or desks within one or more buildings, as provided by a client of the service provider environment 170. In one embodiment, the device management component 120 may associate particular ones of these location values with particular sets of skills referred to as skill groups. In one embodiment, the skill groups may be defined as part of location-specific profiles that can be associated with particular locations. As shown in the example of FIG. 1A, location value 125A may be associated with a location profile 126A, location value 125B may be associated with a location profile 126B, and location value 125M may be associated with a location profile 126M. In one embodiment, a skill group may include indications of one or more of the available skills 160. For example, a particular skill group may reference the names or other identifiers of particular ones of the skills 160. In various embodiments, location profiles 126A-126M may include other types of configuration settings in addition to enabled skills. For example, a location profile may include a time zone, a wake word, a street address, a choice of temperature units, a choice of distance units, and other suitable parameters.

In one embodiment, the device management component 120 may determine and store associations of particular location values with particular location profiles, and the profiles may include or indicate particular skills or skill groups. As shown in the example of FIG. 1A, the location values 125 may include values 125A and 125B through 125M. In one embodiment, a particular location value may be associated with zero, one, or many profiles and/or skill groups. In one embodiment, the same profile may be associated with multiple location values. In the example of FIG. 1A, the location value 125A may be associated with a location-specific profile 126A, and that profile may include or reference one or more skill groups such as skill group 160Q and skill group 160R. The location value 125B may be associated with a location-specific profile 126B, and that profile may include or reference one or more skill groups such as skill group 160Z. A different location value 125M may be associated with a location-specific profile 126M that is also linked to skill group 160Z. The skills in the various skill groups 160Q-160Z may differ (at least in part) from each other. For example, in a hotel environment, the more standard hotel rooms may be associated with a standard hotel room skill group that includes fewer skills than an executive suite skill group (e.g., that also includes the ability to call a concierge service in addition to more standard skills). A front desk or customer service kiosk in the hotel may be associated with different skills than those defined in the standard hotel room skill group or executive suite skill group. As another example, in an office building environment, standard conference rooms may be associated with a standard conference room skill group that includes fewer skills than a secure conference room skill group (e.g., that also includes more security-sensitive skills in addition to more standard skills).

The associations between location values and skill groups may be determined based (at least in part) on user input 121A. The user input 121A may be received from a user, such as an administrator of the devices 150, having sufficient privileges to create and/or modify location-skill associations with the device management component 120. The user input 121A may be received at the device management component 120 using any suitable interface(s). For example, the interface(s) may include a graphical user interface (GUI), a command-line interface, a voice-based interface, a gesture-based interface, an application programming interface (API) or other programmatic interface, and so on. The interface(s) may be offered by the service provider environment 170 and presented to a user on a computing device external to the service provider environment, such as a desktop computer, a laptop computer, a smartphone, a tablet, or any other suitable computing device. For example, a user interface for associating location values with skills may be presented using web browser software executing on the external computing device. The external computing device may be coupled to the service provider environment via one or more networks, potentially including a publicly accessible network such as the Internet and/or an internal or privately accessible network. The external computing device, as operated by a user, may send the user input 121A to the device management component 120 for associating the location values with skill groups via location-specific profiles. In various embodiment, the user's computing device may be located inside or outside of the service provider environment 170.

In one embodiment, the location values 125 may be organized in a hierarchical data structure. The hierarchy may be based (at least in part) on geographical and/or political boundaries. For example, at the top of the hierarchy may exist nodes for several broad geographical regions such as the U.S.A., Europe, China, and so on. The next level of the hierarchy may include nodes for finer-grained locations, such as particular U.S. states under the U.S.A. node. At the next level of the hierarchy, particular campuses, buildings, or facilities may be represented. At the next level, particular rooms or other areas within buildings may be represented. Any of the nodes in the hierarchy may be associated with a set of skills or skill groups that may be assigned to locations associated with those nodes. For example, a room in a particular building in a U.S. state may be assigned skills associated with that room, that building, that state, or that nation. Lower-level nodes may inherit skills from higher-level nodes or may block inheritance of skills from higher-level nodes.

The user's computing device and/or devices 150 may convey network-based service requests to the service provider environment 170 via one or more networks 190 or other communication channels. In one embodiment, the one or more networks 190 may include one or more Wi-Fi networks or other types of wireless local area networks (WLANs). Such network(s) 190 may be implemented using any suitable wireless communication technologies and any suitable configuration of networking components, such as one or more wireless routers. In one embodiment, the one or more networks 190 may include one or more wired networks over a transmission medium such as Ethernet. In various embodiments, the network(s) 190 may encompass any suitable combination of networking hardware and protocols necessary to establish network-based communications between user devices, devices 150, and components of the service provider environment 170. For example, the network(s) 190 may generally encompass the various telecommunications networks and service providers that collectively implement the Internet. The network(s) 190 may also include private networks such as local area networks (LANs) or wide area networks (WANs) as well as public or private wireless networks. In one embodiment, the network (s) 190 may include the hardware (e.g., modems, routers, switches, load balancers, proxy servers, etc.) and software (e.g., protocol stacks, accounting software, firewall/security software, etc.) necessary to establish a networking link between two particular components. In one embodiment, a user device and/or devices 150 may be able to communicate with the service provider environment 170 using a private network rather than the public Internet. In one embodiment, the network(s) 190 may include Bluetooth connections between components or other component-to-component connection functionality.

Figure 8:
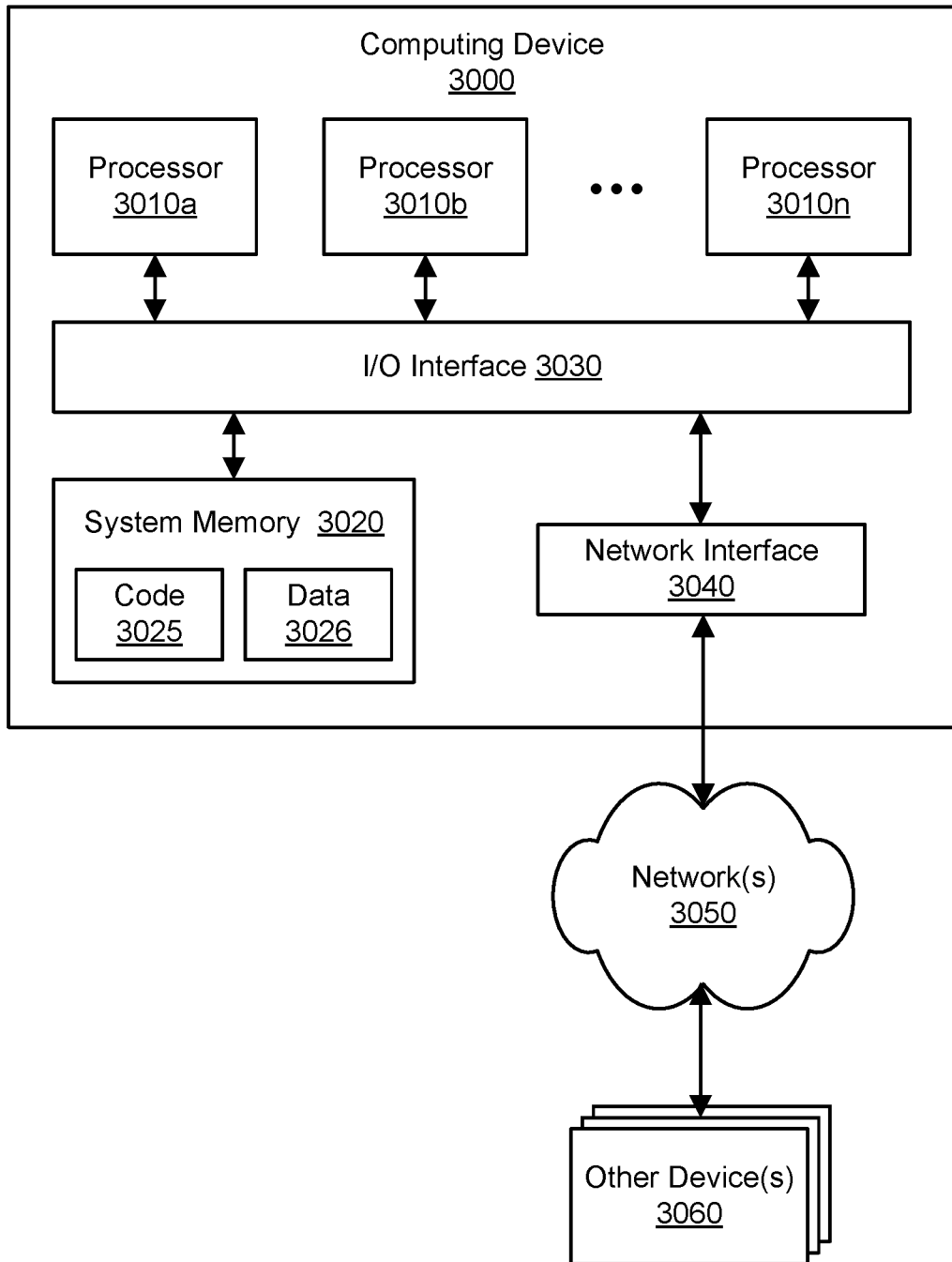
FIG. 8 illustrates an example computing device that may be used in some embodiments.

A user's computing device that provides the input 121A may be implemented by the example computing device 3000 illustrated in FIG. 8. In some embodiments, one or more of the devices 150 may be implemented by the example computing device 3000 illustrated in FIG. 8. The service provider environment 170 may include a plurality of computing devices, any of which may be implemented by the example computing device 3000 illustrated in FIG. 8. In various embodiments, portions of the described components and functionalities of the service provider environment 170 may be provided by the same computing device or by any suitable number of different computing devices. If any of the components of the service provider environment 170 are implemented using different computing devices, then the components and their respective computing devices may be communicatively coupled, e.g., via the one or more networks 190. Each of the illustrated components may represent any combination of software and hardware usable to perform their respective functions. It is contemplated that the devices 150, service provider environment 170, and networking infrastructure 190 may include additional components not shown, fewer components than shown, or different combinations, configurations, or quantities of the components shown.

Figure 1B:
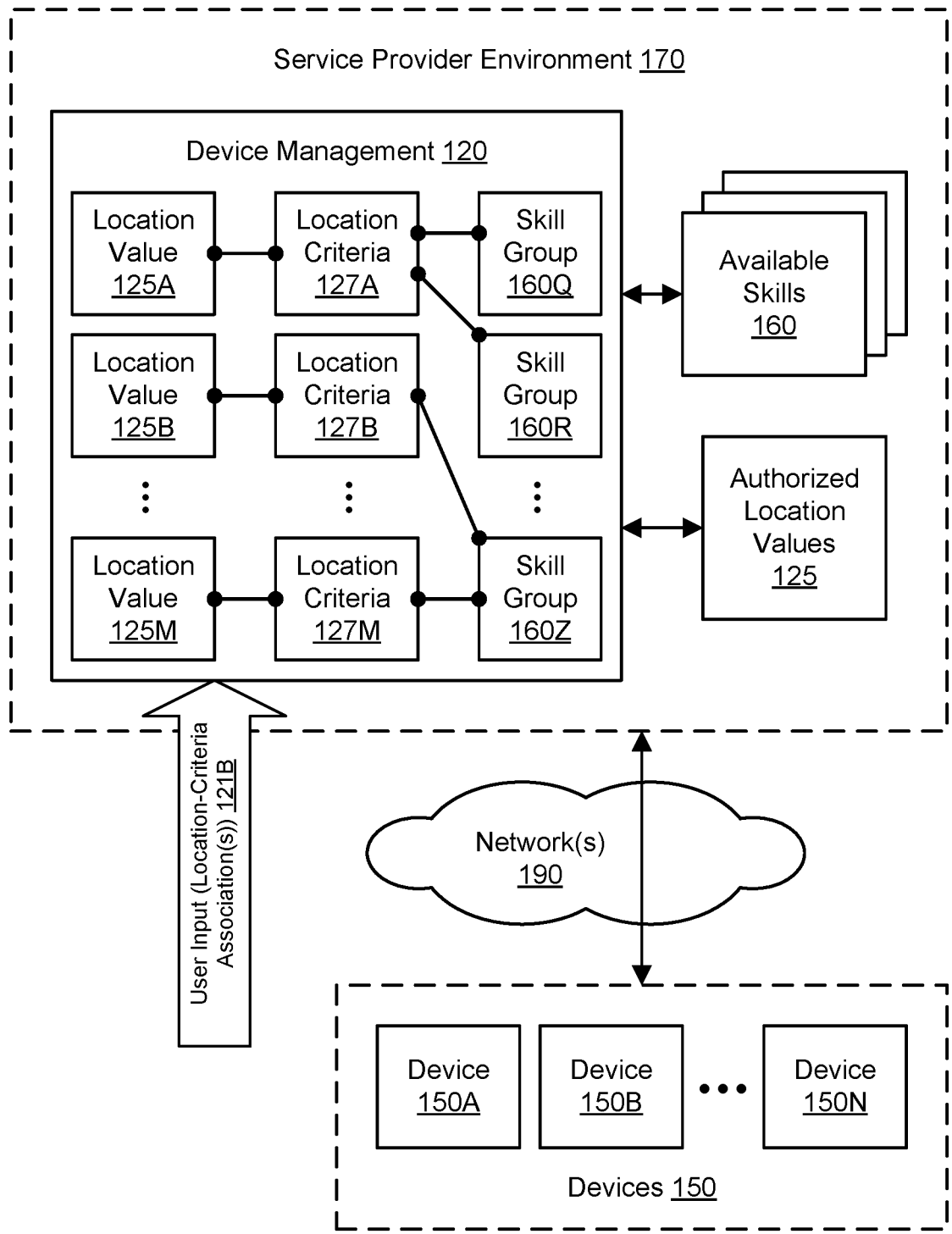
FIG. 1B illustrates an example system environment for location-based functionality for voice-capturing devices, including associating locations with skill groups via location-specific criteria, according to one embodiment.

FIG. 1B illustrates an example system environment for location-based functionality for voice-capturing devices, including associating locations with skill groups via location-specific criteria, according to one embodiment. In one embodiment, skills may be associated with locations via criteria associated with those locations. As shown in the example of FIG. 1B, location value 125A may be associated with location-specific criteria 127A, location value 125B may be associated with location-specific criteria 127B, and location value 125M may be associated with location-specific criteria 127M. The criteria 127A-127M may include various attributes or rules of a location that may be evaluated to automatically and programmatically assign particular skill groups to particular location values. For example, the criteria for a particular location may include a particular geographical region, a particular building, a particular floor of a building, a security setting, an occupant, and other suitable attributes and/or rules. In the example of FIG. 1B, the location value 125A may be associated with one or more location-specific criteria 127A, and those criteria may be evaluated to assign one or more skill groups such as skill group 160Q and skill group 160R. The location value 125B may be associated with one or more location-specific criteria 127B, and those criteria may be evaluated to assign one or more skill groups such as skill group 160Z. A different location value 125M may be associated with one or more location-specific criteria 127M that can be evaluated to also assign the skill group 160Z.

The skills assigned to a location based on evaluation of criteria may differ based on the location-specific criteria. For example, if a room has one criterion of a high-level executive as its occupant, then that room may be assigned a skill group with executive-level skills such as the ability to access sensitive business data. However, a conference room with no occupant specified may not be granted access to the executive-level skill group. As another example, the skills associated with different locations may vary based on different geographical regions associated with those locations. The associations between location values and criteria may be specified based (at least in part) on user input 121B. As discussed above with respect to user input 121A, the user input 121B may be received from a user, such as an administrator of the devices 150, having sufficient privileges to create and/or modify location-skill associations with the device management component 120.

Figure 2:
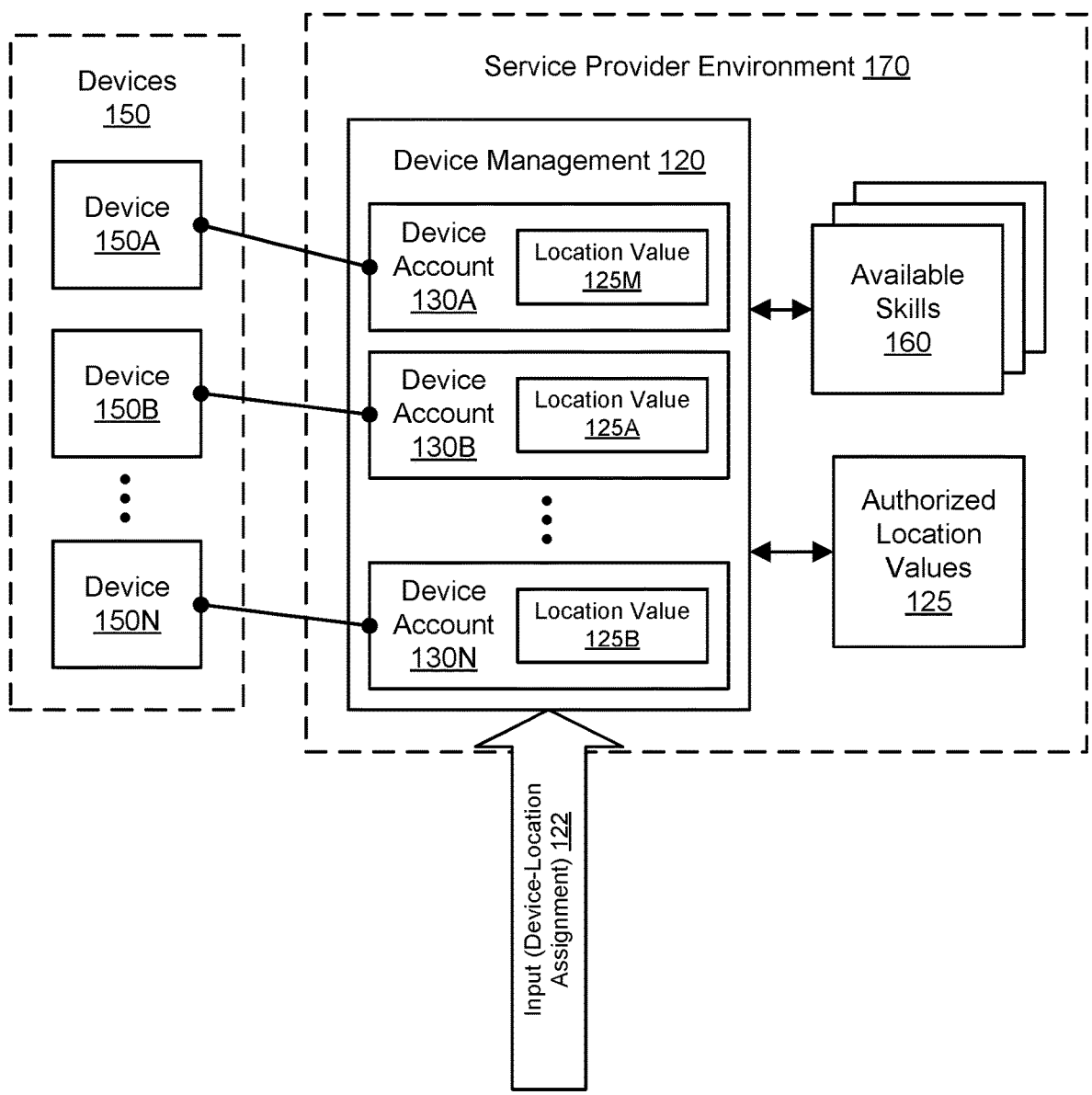
FIG. 2 illustrates further aspects of the example system environment for location-based functionality for voice-capturing devices, including assigning location values for device accounts, according to one embodiment.

FIG. 2 illustrates further aspects of the example system environment for location-based functionality for voice-capturing devices, including assigning location values for device accounts, according to one embodiment. As discussed above, the device management component 120 of the service provider environment 170 may manage the configuration for a set of devices 150 that can interact with the service provider environment. In one embodiment, the device management component 120 in the service provider environment 170 may maintain individual, device-specific accounts for the devices 150A-150N. As shown in the example of FIG. 2, one device-specific account 130A may be created and maintained which corresponds to device 150A, another device-specific account 130B may be created and maintained which corresponds to device 150B, and yet another device-specific account 130N may be created and maintained which corresponds to device 150N. The device-specific accounts 130A-130N may be associated with the devices on a one-to-one basis and not necessarily with a particular user. The device accounts 130A-130N may be maintained for internal use in the service provider environment 170 and may not necessarily be accessible by users of the corresponding devices. The device accounts 130A-130N may also be referred to as shadow accounts. In one embodiment, the device-specific accounts 130A-130N may be generated in the service provider environment 170 during the registration of the corresponding devices 150A-150N. When a device is registered with the device management component 120, information such as an identifier of an authenticated device, e.g., a device-specific identifier or device serial number, may be supplied for device registration and stored with the corresponding device account.

In one embodiment, the device-specific accounts 130A-130N may be associated with device-specific account identifiers (e.g., e-mail addresses) and device-specific access credentials (e.g., passwords) permitting the devices to access the service provider environment. In one embodiment, a device account may be distinct or independent from a personal account associated with the user of the corresponding device. For example, an e-mail address associated with the device account may belong to the service provider environment 170 and not the user and may be unknown to the user. In one embodiment, the device-specific accounts 130A-130N may be assigned to another "umbrella" account or a pool of accounts, such as a corporate account associated with an organizational customer of the service provider environment, e.g., for ease of device management. By separating the device-specific accounts from a user account, the registration and configuration of devices 150 may be performed more efficiently and with greater flexibility. For example, the use of device-specific accounts may bypass a restriction on the number of devices that can be associated with a given user account.

The device accounts 130A-130N may include or reference location values for a location parameter. As shown in the example of FIG. 2, the device account 130A may include or reference a location value 125M, the device account 130B may include or reference a location value 125A, and the device account 130N may include or reference a location value 125B. The device management component 120 may verify that any user-supplied location values represent authorized and permissible values, e.g., by comparing the user-supplied value to a set of authorized location values 125. The authorized values 125 may be specified, defined, updated, or otherwise configured by an administrator associated with the devices 150. The location values 125A-125M may represent any suitable names, nicknames, coordinates, or other identifiers of particular locations. For example, a location value may represent a particular room in a building or on a campus that includes multiple rooms. As another example, a location value may represent a particular conference room, office, or other space within a particular office building. As a further example, a location value may represent a particular room or area within a particular residence. As yet another example, a location value may represent a particular hotel room, common area, or front desk within a particular hotel. The authorized locations 125 may include any suitable number and configuration of discrete location identifiers. In one embodiment, the location identifiers may include nicknames or alternative names for the same location.

The location values 125A-125M for the device accounts 130A-130N may be set using any suitable form(s) of input 122. In one embodiment, the location values may be set by user input from an administrator of the devices 150, e.g., using a management console for the device management component 120. In one embodiment, the location values may be determined without necessarily requiring user input, e.g., based (at least in part) on automatic geolocation techniques, such as global positioning system (GPS) sensors on the devices 150, analysis of interactions between the devices and the networking infrastructure 190, and so on. In one embodiment, a location value for a device account may be configured based (at least in part) on voice input captured using the corresponding device. For example, in conjunction with a spoken command such as "set the location . . . " or "add this device to . . . ," the service provider environment 170 may determine that any terms following the command may represent the location of the device. In one embodiment, the user may be prompted to supply the location value for the device after attempting to invoke another a functionality that is dependent on that value. For example, if the user issues a command to schedule a conference, and the skill for conference scheduling requires a location for the device, then the service(s) may cause the device 150 to ask for the value for the location parameter if the value is not already set.

In one embodiment, a location identifier supplied by a user may not be an exact match for any of the authorized location values 125. For example, the user-supplied value may represent only a portion of a permissible value, may represent a nickname or alternative name for a permissible value, or may map to two or more of the authorized values 125. In some circumstances, the device management component 120 may select the location value for the device account from the set of discrete authorized values 125 by making the closest match to the user-supplied value, e.g., when the user-supplied value represents an alternative name of a location or a sufficiently large portion of a permissible value. In one embodiment, the service provider environment 170 may take any other suitable steps to resolve or disambiguate an ambiguous user-supplied location value, such as by asking the user for additional input to clarify the location value.

In various embodiments, a device account may include other parameters such as a networking credential (e.g., a wireless networking credential) that permits the device to access a local area network (e.g., a Wi-Fi network), a "wake word" to activate voice capture on detection of audible speech including the word, a time zone, and/or other suitable configuration parameters to be stored in the service provider environment 170 and potentially on the device as well. In one embodiment, a device account may include an indication of skills 160 that are accessible to the device apart from the location-based functionality described herein. For example, device accounts may be configured with a default set of one or more fundamental skills that are accessible regardless of the location of the device. In various embodiments, all or part of a device's configuration parameters may be stored remotely in the service provider environment 170 and/or in storage locally accessible to the device itself. For example, a full set of configuration parameter values may be stored by the device management component 120, while a more limited set of configuration parameters may be stored on the device.

In one embodiment, a location value or other parameter value may be set by any user. In one embodiment, a location value or other parameter value may be set by any user only if the parameter value has not already been set. In one embodiment, a location value or other parameter value may be set for a device only if the user has sufficient privileges to do so with respect to that device. The authorization (or lack thereof) of the user to perform a configuration change may be determined in any suitable manner. For example, voice identification against a known voice profile may be used to verify the identity of the user. As another example, other biometric authentication of the user, such as fingerprint identification, may be performed using the device to verify the identity of the user. As a further example, the user may be authorized based (at least in part) on the presence of a previously authorized smartphone or other mobile device as a beacon in the vicinity of the device, e.g., on the same wireless network or with a direct Bluetooth connection. As yet another example, the user may be asked to speak a password or PIN code in order to perform the configuration setting.

Figure 3:
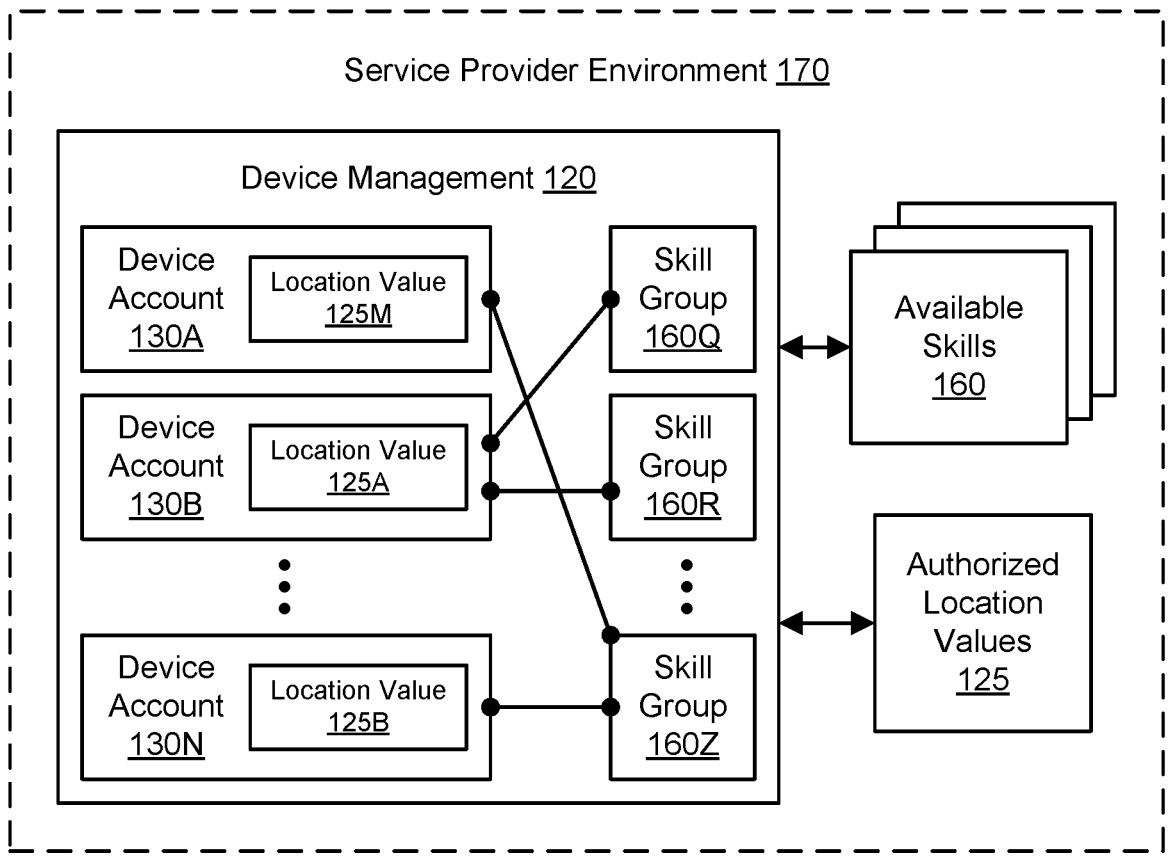
FIG. 3 illustrates further aspects of the example system environment for location-based functionality for voice-capturing devices, including automatically associating device accounts with skill groups based (at least in part) on the location values for device accounts, according to one embodiment.

FIG. 3 illustrates further aspects of the example system environment for location-based functionality for voice-capturing devices, including automatically associating device accounts with skill groups based (at least in part) on the location values for device accounts, according to one embodiment. As shown previously, the device account 130A may include or reference a location value 125M, the device account 130B may include or reference a location value 125A, and the device account 130N may include or reference a location value 125B. The device management component 120 may automatically (e.g., without necessarily requiring user input) and programmatically (e.g., by execution of program instructions) enable skills for the corresponding devices based (at least in part) on the location values for the device accounts and the skills associated with those location values. As shown in the example of FIG. 3, the skill group 160Z may be enabled for device account 130A based (at least in part) on an association between the device's location 125M and a location-specific profile 126M or location-specific criteria 127M. Similarly, the same skill group 160Z may be enabled for device account 130N based (at least in part) on an association between the device's location 125B and a location-specific profile 126B or location-specific criteria 127B. Additionally, the skill groups 160R and 160Q may be enabled for device account 130B based (at least in part) on an association between the device's location 125A and a location-specific profile 126A or location-specific criteria 127A.

If a device is moved to a new location, then any skills associated with the old location but not the new location may be disabled for the device. For example, in a hotel environment, if a device is moved from an executive suite to a standard hotel room, and the location value is updated properly, then one or more skills previously enabled for the device in the executive suite may now be disabled due to the differing skills associated with the new location. If the skill group or profile for a location is modified, then the enabled skills for any devices in that location may also be modified automatically rather than manually and individually for each of the devices. Modification of a skill group may include adding one or more skills or removing one or more skills. Such modifications may be promulgated automatically and programmatically for any affected devices, e.g., devices having location values associated with modified profiles. In this manner, configuration of devices and their enabled skills may be performed with greater efficiency and flexibility.

The service provider environment 170 may implement synchronization of devices and skills. In various embodiments, synchronization may be triggered by the assignment of a location value to the device account, by the modification of skills or other settings in a profile or criteria associated with a location, by the removal of an association between a location and a skill group, and/or by the addition of an association between a location and a skill group. In one embodiment, when such a modification takes place, a message is queued for asynchronous processing by a worker process. Responsive to that message, a set of devices may be determined that may potentially be affected by the modification. With another asynchronous process, the desired state of those devices (e.g., as configured by an administrator) may be determined by reference to a data store maintained by the device management component. If the actual state for any device in any component of the service provider environment differs from its desired state, then the actual state may be adjusted to the desired state, e.g., by making appropriate calls to any skills or other components having the incorrect state.

Figure 4:
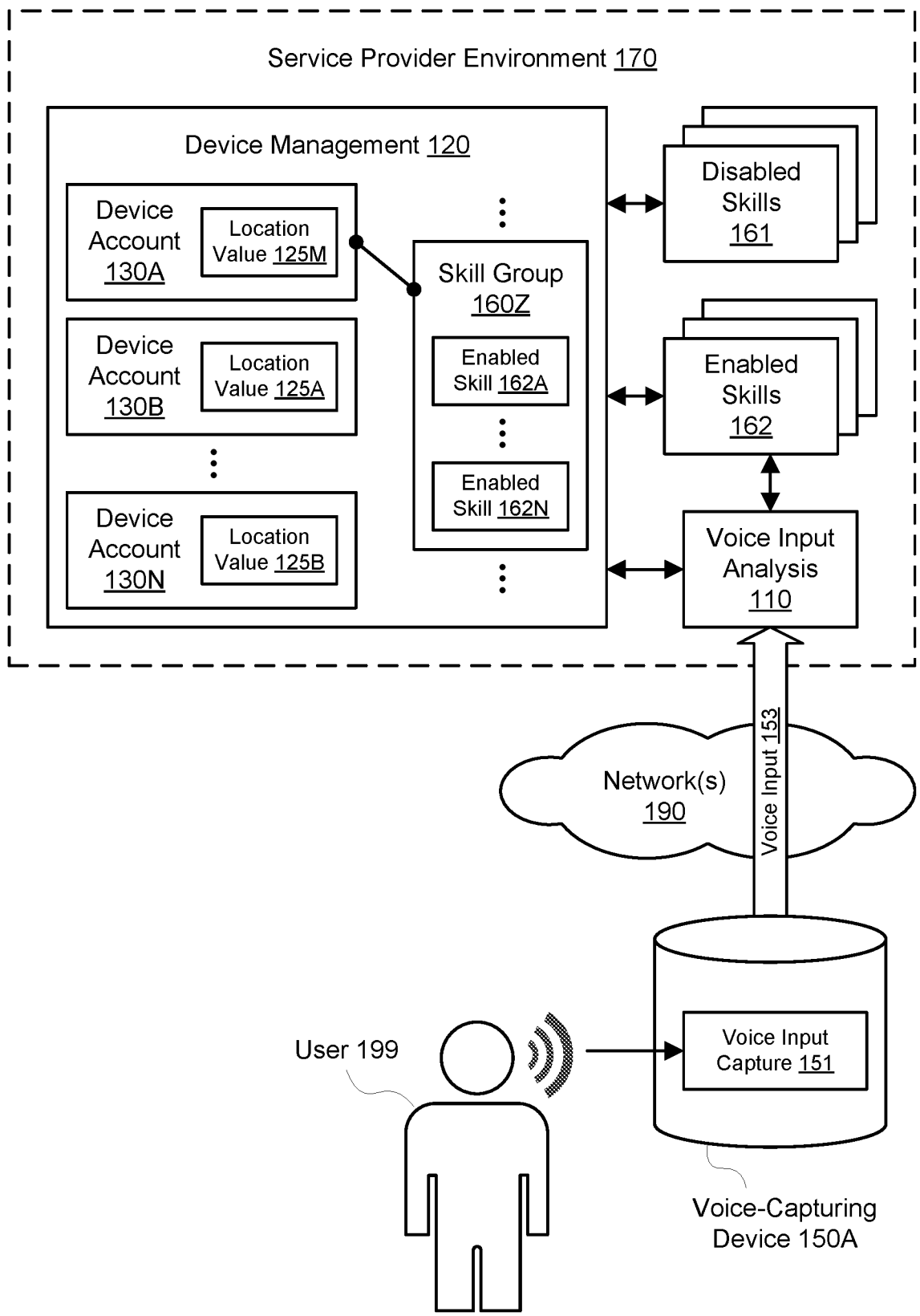
FIG. 4 illustrates further aspects of the example system environment for location-based functionality for voice-capturing devices, including a voice-capturing device providing input to invoke a skill enabled for the device based (at least in part) on the skill group(s) associated with the device's location, according to one embodiment.

FIG. 4 illustrates further aspects of the example system environment for location-based functionality for voice-capturing devices, including a voice-capturing device providing input to invoke a skill enabled for the device based (at least in part) on the skill group(s) associated with the device's location, according to one embodiment. The service provider environment 170 may include one or more voice-based components or services such as a voice input analysis component 110. A device 150A may stream or otherwise send voice input 153 to the voice-based service(s) provided by the service provider environment 170. In one embodiment, the voice capture may be prompted by detection of an audible "wake word" associated with the device 150A, e.g., using voice input capture 151 (e.g., including one or more microphones or other audio detection components) to monitor audio in the vicinity of the device while the device is powered on and appropriately configured. In one embodiment, the voice input capture 151 may be prompted by a button press, a gesture, or another suitable user interaction instead of a wake word. In one embodiment, after the wake word or other user-supplied prompt is detected, the voice input capture 151 may continue to record (and the device 150A may continue to stream) audio input 153 until a pause of suitable duration is detected; until the voice-based service(s) instruct the device to stop; until a particular duration has been reached for the captured audio; or until a button press, gesture, or other suitable user interaction is received to end the voice capture.

The voice input analysis 110 may analyze the voice input 153 and invoke one or more actions responsive to the voice input, such as generating and sending voice output back to the originating device 150A for playback on the device. The actions and/or voice output may vary based on the resources and/or services of the service provider environment 170, also referred to herein as skills, that are accessible to and enabled for the device 150A. Based (at least in part) on the location-specific profile 126M or location-specific criteria 127M associated with the location value 125M for the device account 130A corresponding to the device 150A, a set of the available skills 160 may be enabled for the device and may be referred to as enabled skills 162. The enabled skills 162 may include any skills indicated or referenced in the one or more skill groups 160Z. As shown in the example of FIG. 4, the enabled skills 162 may include skills 162A through 162N, as defined in a skill group 160Z associated with the profile 126M or criteria 127M. In one embodiment, the enabled skills 162 may also include skills not included in the skill group 160Z, e.g., one or more fundamental skills enabled for all devices by default. By enabling the skills 162 for the device 150A, the service provider environment 170 may allow the device to invoke any of those enabled skills with suitable input such as voice input. The skills 162 may be enabled automatically (e.g., without necessarily requiring user input) and/or programmatically (e.g., by execution of program instructions) based (at least in part) on the setting of the location value 125M for the device account 130A corresponding to the device 150A.

Based (at least in part) on the skill group(s) associated with the location value 125M for the device account 130A corresponding to the device 150A, another set of the available skills 160 may be disabled for the device and may be referred to as disabled skills 161. In one embodiment, the disabled skills 161 may include any skills not indicated or referenced in the one or more skill groups associated with the location. By disabling the skills 161 for the device 150A, the service provider environment 170 may not allow the device to invoke any of those disabled skills. The skills 161 may be disabled automatically (e.g., without necessarily requiring user input) and/or programmatically (e.g., by execution of program instructions) based (at least in part) on the setting of the location value 125M for the device account 130A corresponding to the device 150A.

In one embodiment, the voice input 153 may represent speech input from a user 199. The speech may include natural language speech. The voice input 153 may represent digital audio in any suitable format. The voice input 153 may be streamed or otherwise sent from the device 150 to a component such as the voice input analysis 110. In one embodiment, the voice input analysis 110 may be provided in a voice-based system that implements a voice-based interface for devices, while the device management component 120 may be provided by a different (but related) system targeted to device management for businesses, educational institutions, and/or residences. Using the voice input analysis 110, the voice input 153 may be decoded to determine one or more individual terms or phrases that are present in the audio. In one embodiment, one or more of the terms may represent commands to invoke skills or functionalities that are enabled for the device 150A in the service provider environment 170. In one embodiment, one or more of the terms may represent data usable by skills or functionalities. In one embodiment, the same voice input 153 may include an invocation of a skill or functionality and also arguments or other data usable by that skill or functionality.

In one embodiment, suitable ones of the skills 162 may be performed using or responsive to the location value 125M for the device account 130A. For example, a skill for joining a conference call may be performed based (at least in part) on the location of the device 150A, e.g., by also determining any conference calls scheduled for that location. As another example, if the user 199 invokes a room service skill in a hotel, then the room service skill may generate an instruction to hotel staff that specifies the location of the device 150A. As a further example, if the user 199 invokes a skill to turn on or off the lights, the skill may be performed based (at least in part) on the location of the device 150A. In such an example, the device account 130A may include metadata that enables a lights skill for the corresponding device, potentially due to the lights skill being enabled for any device in this particular location. Upon invocation, the lights skill may perform a lookup to determine the identity of the lights in the device's location, potentially determine their capabilities, and issue commands to appropriate infrastructure components to modify the state of those lights. In one embodiment, the lights skill may toggle the lights in the room between on and off when the skill is invoked. In one embodiment, the lights skill may maintain metadata indicating an on/off state of the lights in the location, and the voice input invoking the skill may indicate whether the lights should be turned on or turned off. In one embodiment, a voice-based service in the service provider environment 170 may solicit additional information from a user 199 of the device 150A based on the initial invocation of the lights skill, such as whether to turn the lights on or off, whether to turn the lights on or off now or at a later time, whether to turn the lights on or off completely or instead dim the lights, what color to select if the lights can display different colors, and so on. In one embodiment, the lights skill may be authorized only for particular users, and the service provider environment 170 may require authorization of an identity of the user

199 before performing the requested action. Skills may also utilize custom parameter values such as a phone number associated with a device or associated with a user of a device.

In one embodiment, the invoked skill may be flagged as security-sensitive. For example, the skill may be configured to recite sensitive financial data associated with an organization. The security-sensitive skill may be enabled only for secure locations, e.g., locations having a skill group or criteria associated with greater security. For example, particular executive offices may be granted access to the security-sensitive functionality for reciting sensitive financial data, while the skill may be disabled for other locations. In one embodiment, authorization to access a particular skill, such as a security-sensitive skill, may be granted based (at least in part) on the identity of the user. In one embodiment, such a security-sensitive skill may be enabled only for particular secure locations and for particular users; both the location value and the user identity may be verified before authorizing access to the security-sensitive skill. In one embodiment, such a security-sensitive skill may be enabled for particular users for any location, but the user may be required to submit additional authorization information (e.g., a password) to invoke the skill in a relatively insecure location. The user identity may be verified in any suitable manner. For example, voice identification against a known voice profile may be used to verify the identity of the user. As another example, other biometric authentication of the user, such as fingerprint identification, may be performed using the device to verify the identity of the user. As a further example, the user may be authorized based (at least in part) on the presence of a previously authorized smartphone or other mobile device as a beacon in the vicinity of the device, e.g., on the same wireless network or with a direct Bluetooth connection. As yet another example, the user may be asked to speak a password or PIN code in order to access the security-sensitive skill. In one embodiment, skills may be enabled for a particular location, but the results of the skill or the resources available to the skill may vary based on the identity of the user. For example, a hotel room skill group may include a skill for playing music, and a particular user of a smart speaker in a hotel room with that skill group may have access to the user's personal music collection as well as standard music choices. In one embodiment, skills or skill groups may be enabled based on a combination of the location, the user, the device, the device type, the device vendor, and/or any other suitable criteria. For example, access to a particular skill or skill group may be denied based on location, even though the skill or skill group is otherwise enabled for a particular user and particular device.

Figure 5:
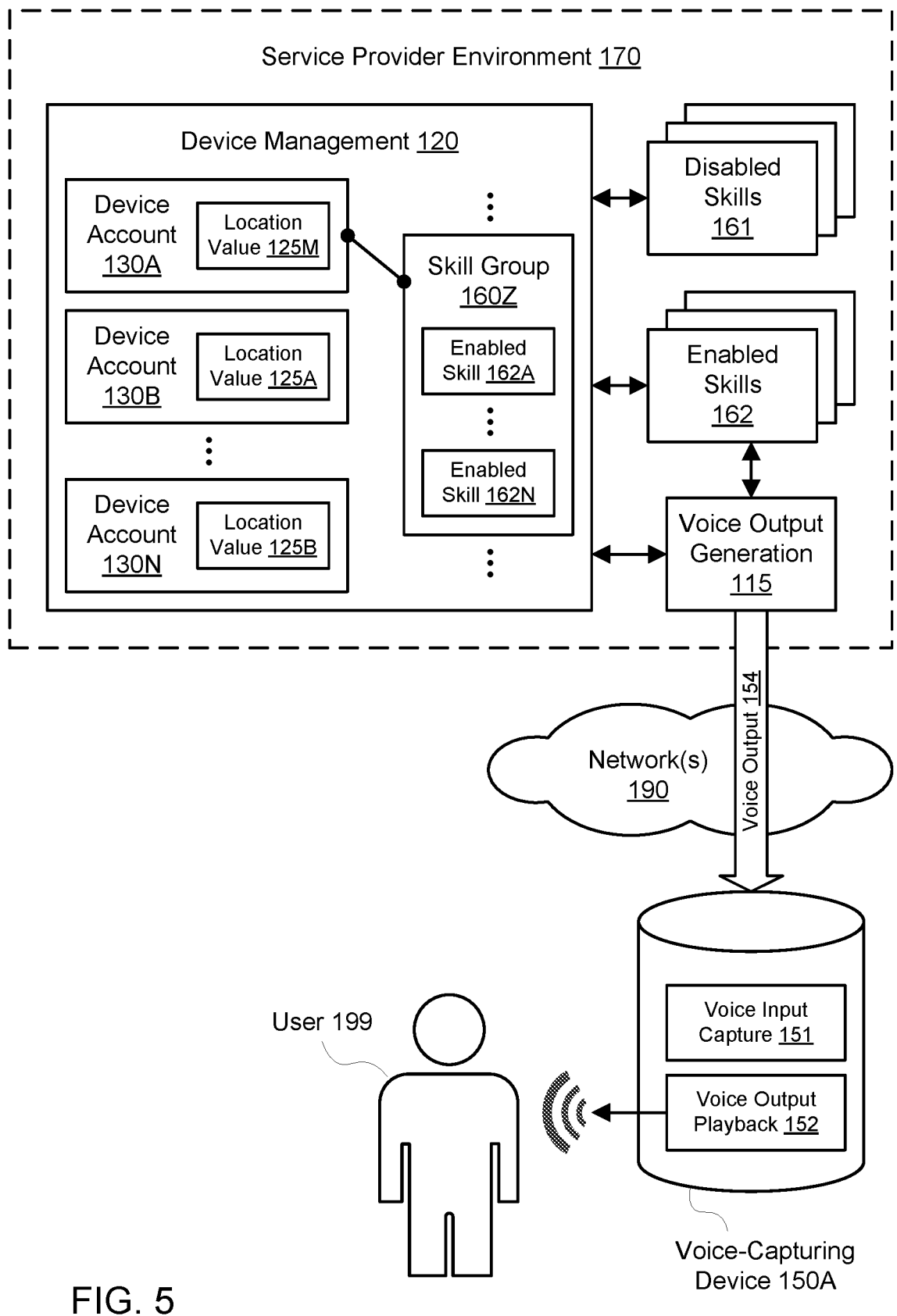
FIG. 5 illustrates further aspects of the example system environment for location-based functionality for voice-capturing devices, including providing output of an enabled skill to the voice-capturing device that invoked the skill, according to one embodiment.

FIG. 5 illustrates further aspects of the example system environment for location-based functionality for voice-capturing devices, including providing output of an enabled skill to the voice-capturing device that invoked the skill, according to one embodiment. The service provider environment 170 may take one or more actions in response to the invocation of an enabled skill by the device 150A. For example, using a voice output generation component or service 115, the service provider environment 170 may generate audio output such as synthetic, computer-generated speech. The voice output 154 may represent an answer to a question posed by the user 199 in the voice input 153, an acknowledgement that a requested task was performed successfully, a request for additional input from the user 199, and/or any other suitable form of audio interaction. In one embodiment, the device 150A may include or have access to a voice output playback component 152, including a speaker and/or other suitable audio-generating component(s), usable to play back audio output including computer-generated speech. In various embodiments, the voice output playback 152 may be located on board the device 150A or instead located in another device, such as a remote control. The service provider environment 170 may stream or otherwise send the voice output 154 to the device 150A, and the device may play back the output for the user 199 using the voice output playback 152.

Figure 6:
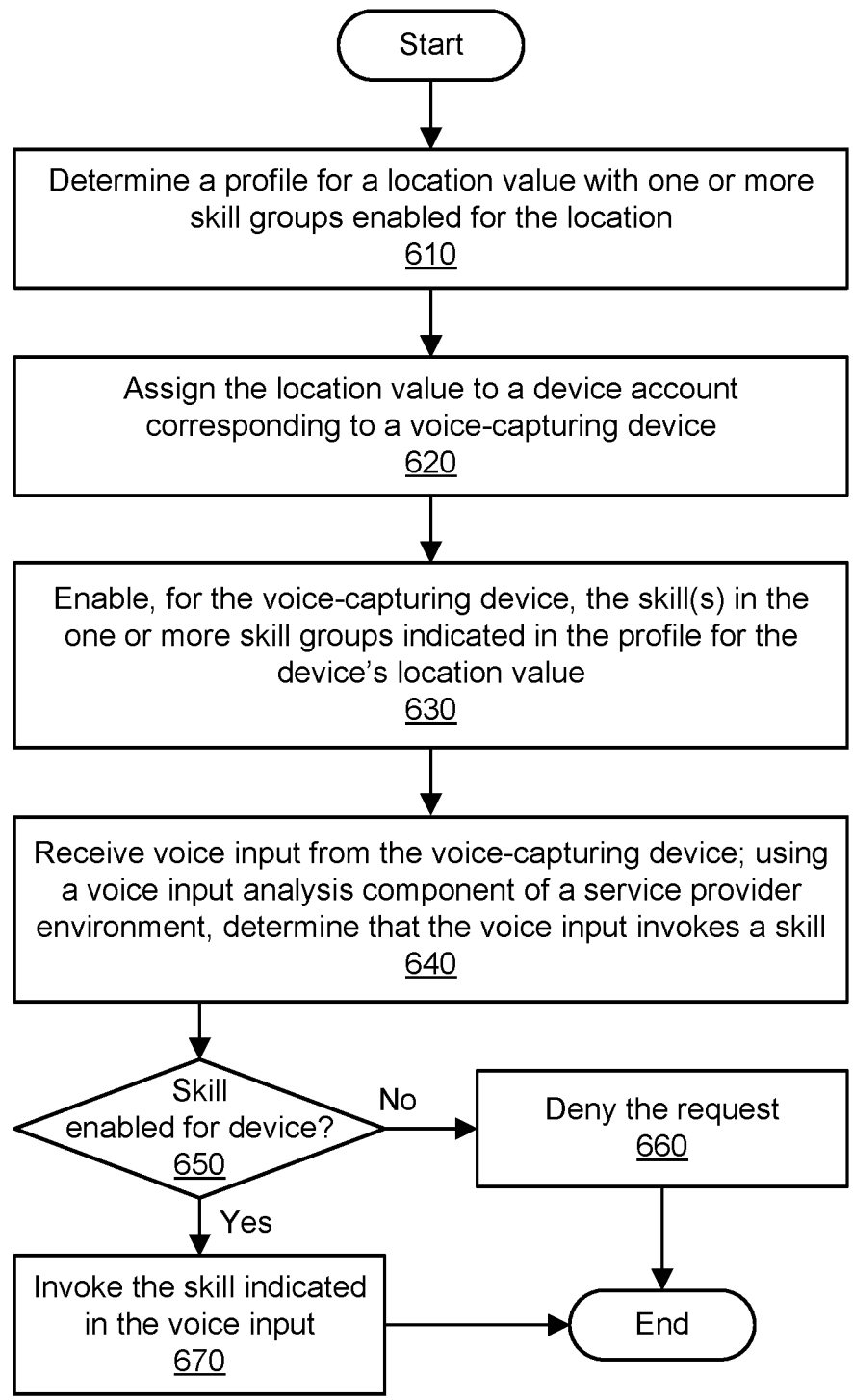
FIG. 6 is a flowchart illustrating a method for location-based functionality for voice-capturing devices, according to one embodiment.

FIG. 6 is a flowchart illustrating a method for location-based functionality for voice-capturing devices, according to one embodiment. As shown in 610, a location-specific profile may be determined for a location value. In one embodiment, the profile may be determined and stored using a device management component of a service provider environment. The profile may include or reference one or more skill groups representing skills (e.g., functionalities provided by the service provider environment) that are enabled for the corresponding location. In one embodiment, the location-specific profile may indicate one or more criteria that may be evaluated dynamically to assign skills to the location. As shown in 620, the same location value may be assigned to a device-specific account that corresponds to a particular device. The device may represent a desktop computing device, a laptop computing device, a smartphone, a tablet or other mobile device, a smart speaker or other voice-capturing device, a home automation or other IoT device, and so on. The device account may be maintained for the device by the device management component of the service provider environment. In one embodiment, the location assignment may be determined and stored using the device management component.

As shown in 630, one or more skills in the one or more skill groups in the profile may be enabled for the device. The skill(s) may be enabled based (at least in part) on the assignment of the location value to the device account and on the association between that location value and those skill(s). The skill(s) may be enabled automatically and programmatically. Enabling the skill(s) for the device may include making the skill(s) accessible to be invoked on behalf of the device. For example, if the location has a standard hotel room skill group that includes a skill for making a room service request, then such a skill may be enabled automatically for any device in that location. In one embodiment, one or more skills may be disabled for the device due to their lack of inclusion in the skill group(s) in the profile or criteria associated with the device's location. For example, if is the location has a standard hotel room skill group that excludes more advanced skills associated with executive suites, then such advanced skills may be disabled automatically for any device in that location.

As shown in 640, voice input may be received from the device. Using a voice input analysis component of the service provider environment, the voice input may be analyzed to determine that the input represents the invocation of a skill available in the service provider environment. For example, the invoked skill may represent a request to access sensitive financial reports for an organization; such a skill may be enabled only for select locations such as the offices of particular executives in the organization. As shown in 650, whether the skill is enabled for the device may be determined. In one embodiment, the skill may be enabled for the device only if the skill is included in a profile for the device's location or otherwise associated with the device's location. If the skill is not enabled for the device, then as shown in 660, the request may be denied. If the device is a smart speaker, then voice output representing the denial may be generated and sent to the device for playback to the user. If the skill is enabled for the device, then as shown in 670, the skill may be invoked in the service provider environment. For example, the financial-report skill may retrieve relevant financial data and generate voice output including computer-generated speech reciting the financial data, potentially in conjunction with a voice output generation component. The voice output may be streamed or sent to the device for playback to the user.

Figure 7:
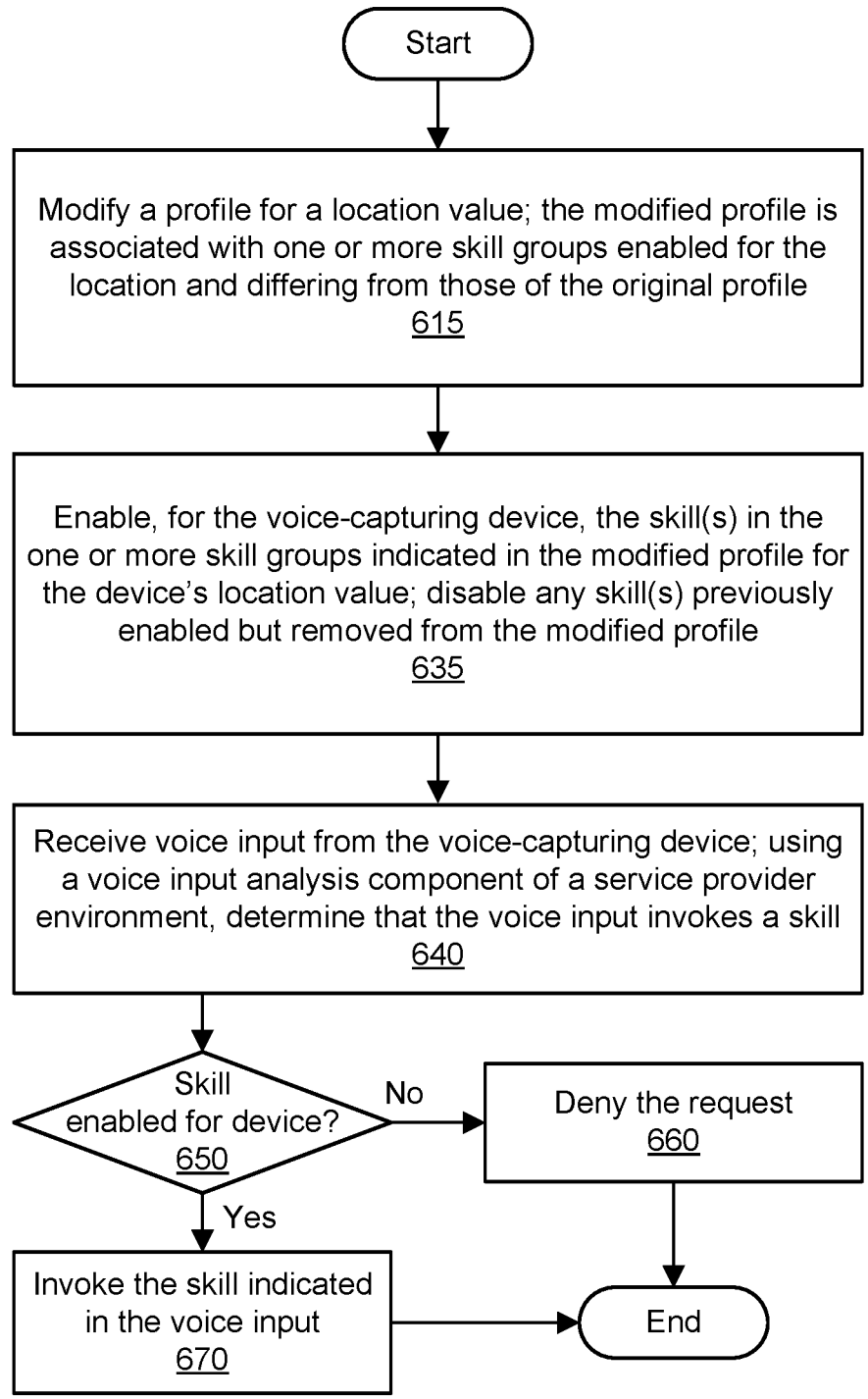
FIG. 7 is a flowchart illustrating further aspects of the method for location-based functionality for voice-capturing devices, including modifying the skill(s) enabled for a device based (at least in part) on modification of the profile associated with the device's location, according to one embodiment.

FIG. 7 is a flowchart illustrating further aspects of the method for location-based functionality for voice-capturing devices, including modifying the skill(s) enabled for a device based (at least in part) on modification of the profile or skill group associated with the device's location, according to one embodiment. As shown in 615, a profile may be modified to alter the skills associated with the profile. Modification of the profile may include adding one or more skills and/or removing one or more skills. The skills in the modified profile may differ from those specified or referenced in the original, unaltered profile. The profile may be associated with a location value, such as the location value associated with the device discussed with reference to FIG. 6.

As shown in 635, one or more skills in the modified profile may be enabled for any device in the corresponding location. For example, the skill(s) in the modified profile may be enabled for the device discussed with reference to FIG. 6, even after the device's location has been set. The skill(s) may be enabled based (at least in part) on the assignment of the location value to the device account and on the association between that location value and the modified profile that includes those skill(s). The skill(s) may be enabled automatically and programmatically. Enabling the skill(s) for the device may include making the skill(s) accessible to be invoked by or on behalf of the device. For example, if the location has a standard hotel room skill group that is modified to include a skill for making a room service request, then such a skill may be enabled automatically for any device in that location. In one embodiment, one or more skills may be disabled for the device due to their lack of inclusion in the skill group(s) in the modified profile associated with the device's location, even when the profile is modified after the device's location has been set. Similarly, if the profile for a particular location is modified, then skills may be enabled and/or disabled for any devices in that particular location based (at least in part) on that modified profile.

As shown in 640, voice input may be received from the device. Using a voice input analysis component of the service provider environment, the voice input may be analyzed to determine that the input represents the invocation of a skill available in the service provider environment. For example, the invoked skill may represent a request to access sensitive financial reports for an organization; such a skill may be enabled only for select locations such as the offices of particular executives in the organization. As shown in 650, whether the skill is enabled for the device may be determined. In one embodiment, the skill may be enabled for the device only if the skill is included in the modified profile associated with the device's location. If the skill is not enabled for the device, then as shown in 660, the request may be denied. If the device is a smart speaker, then voice output representing the denial may be generated and sent to the device for playback to the user. If the skill is enabled for the device, then as shown in 670, the skill may be invoked in the service provider environment. For example, the financial-report skill may retrieve relevant financial data and generate voice output including computer-generated speech reciting the financial data, potentially in conjunction with a voice output generation component. The voice output may be streamed or sent to the device for playback to the user.

Illustrative Computer System

In at least some embodiments, a computer system that implements a portion or all of one or more of the technologies described herein may include a computer system that includes or is configured to access one or more computer-readable media. FIG. 8 illustrates such a computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   one or more computing devices implementing one or more services in a service provider environment, wherein the one or more services comprise a voice input analysis component, a device management component, and a set of available voice-enabled functionalities; and
   a voice-capturing device, wherein the voice-capturing device is communicatively coupled to the service provider environment over one or more networks; and
   wherein the device management component is executable by the one or more computing devices to:
      store an association between a location value for a location parameter and one or more voice-enabled functionalities selected from the set of available voice-enabled functionalities, wherein the location value is in a set of authorized location values for granting access to the one or more voice-enabled functionalities associated with the location parameter;
      maintain a device account corresponding to the voice-capturing device;
      store an assignment of the location value to the device account, wherein the assignment that is stored indicates that the voice-capturing device is in a location associated with the location value; and
      based at least in part on a determination that the location value, that is associated with the device via the assignment, is in the set of authorized location values, enable the one or more voice-enabled functionalities associated with the location value for use by the voice-capturing device such that, at least partly responsive to a request by the voice-capturing device, the service provider environment performs one or more tasks associated with the one or more voice-enabled functionalities.

2. The system as recited in claim 1, wherein the voice input analysis component is executable by the one or more computing devices to:
   receive voice input from the voice-capturing device;

perform voice input analysis on the voice input, wherein the voice input analysis determines that the voice input represents a request for an individual one of the one or more voice-enabled functionalities; and invoke the individual one of the one or more voice-enabled functionalities based at least in part on the voice input analysis.

3. The system as recited in claim 1, wherein the voice input analysis component is executable by the one or more computing devices to:

receive voice input from the voice-capturing device;

perform voice input analysis on the voice input, wherein the voice input analysis determines that the voice input represents a request for a voice-enabled functionality not associated with the location value; and deny the request for the voice-enabled functionality not associated with the location value.

4. The system as recited in claim 1, wherein the device management component is executable by the one or more computing devices to:

generate a modified profile for the location value, wherein the modified profile indicates a modified set of the one or more voice-enabled functionalities; and based at least in part on the assignment of the location value to the device account and on the modified profile, enable the modified set of one or more voice-enabled functionalities in the modified profile for use by the voice-capturing device.

5. A computer-implemented method, comprising:

storing an association between a location value for a location parameter and one or more functionalities, wherein the association between the location value and the one or more functionalities is stored by a device management component of a service provider environment, and wherein the location value is in a set of one or more authorized location values for granting access to the one or more functionalities associated with the location parameter;

storing an assignment of the location value to a device account maintained by the device management component, wherein the device account is associated with a device communicatively coupled to the service provider environment via one or more networks, wherein the device account comprises one or more configuration parameter values associated with operation of the device, wherein the assignment is stored by the device management component, and wherein the assignment that is stored indicates that the device is in a location associated with the location value; and based at least in part on a determination that the location value, that is associated with the device via the assignment, is in the set of one or more authorized location values, enabling the one or more functionalities for use by the device such that, at least partly responsive to a request by the device, the service provider environment performs one or more tasks associated with the one or more voice-enabled functionalities.

6. The method as recited in claim 5, further comprising:

receiving voice input from the device at the service provider environment;

performing voice input analysis on the voice input in the service provider environment, wherein the voice input analysis determines that the voice input represents a request for an individual one of the one or more functionalities associated with the location value assigned to the device account corresponding to the device; and invoking the individual one of the one or more functionalities based at least in part on the voice input analysis.

7. The method as recited in claim 5, wherein the device is associated with an audio output component, and wherein the method further comprises:

generating voice output associated with the individual one of the one or more functionalities, wherein the voice output is sent over the one or more networks from the service provider environment to the device; and causing the voice output to be played via the audio output component.

8. The method as recited in claim 5, further comprising:

receiving voice input from the device at the service provider environment;

performing voice input analysis on the voice input in the service provider environment, wherein the voice input analysis determines that the voice input represents a request for an additional functionality not associated with the location value assigned to the device account corresponding to the device; and denying the request for the additional functionality.

9. The method as recited in claim 5, further comprising:

modifying the association between the location value and the one or more functionalities, comprising determining and storing a modified association between the location value and a modified set of one or more functionalities of the service provider environment; and based at least in part on the assignment of the location value to the device account and on the modifying of the association, enabling the modified set of one or more functionalities for use by the device.

10. The method as recited in claim 5, further comprising:

storing a modification to the one or more functionalities associated with the location value;

determining a set of devices affected by the modification, wherein the set of devices includes the device;

determining the desired state of the set of devices in a data store maintained by the device management component; and adjusting an actual state in the service provider environment to the desired state for one or more of the set of devices.

11. The method as recited in claim 5, wherein the one or more functionalities are associated with the location value based at least in part on evaluation of one or more criteria associated with the location value.

12. The method as recited in claim 5, wherein the one or more functionalities associated with the location value comprise a user-specific functionality, and wherein the method further comprises:

receiving voice input from the device at the service provider environment;

performing voice input analysis on the voice input in the service provider environment, wherein the voice input analysis determines that the voice input represents a request for the user-specific functionality;

verifying that the voice input is associated with a user authorized to access the user-specific functionality; and invoking the user-specific functionality based at least in part on the verifying.

13. The method as recited in claim 5, wherein the association between the location value and the one or more functionalities comprises an association between the location value and a location-specific profile indicating the one or more functionalities, wherein an additional location value defined by the device management component is associated with an additional location-specific profile indicating a different set of one or more functionalities of the service provider environment.

14. A non-transitory computer-readable storage medium storing program instructions computer-executable to perform:
    storing an association between a location value for a location parameter and one or more voice-enabled functionalities, wherein the association between the location value and the one or more voice-enabled functionalities is stored by a device management component of a service provider environment, and wherein the location value is in a set of one or more authorized location values for granting access to the one or more voice-enabled functionalities associated with the location parameter;
    storing an assignment of the location value to a device account maintained by the device management component, wherein the device account is associated with a voice-capturing device communicatively coupled to the service provider environment via one or more networks, wherein the assignment is stored by the device management component, and wherein the assignment that is stored indicates that the voice-capturing device is in a location associated with the location value; and
    based at least in part on a determination that the location value, that is associated with the voice-capturing device via the assignment, is in the set of one or more authorized location values, enabling the one or more voice-enabled functionalities for use by the voice-capturing device such that, at least partly responsive to a request by the voice-capturing device, the service provider environment performs one or more tasks associated with the one or more voice-enabled functionalities.

15. The non-transitory computer-readable storage medium as recited in claim 14, wherein the program instructions are further computer-executable to perform:
    receiving voice input from the voice-capturing device at the service provider environment;
    performing voice input analysis on the voice input in the service provider environment, wherein the voice input analysis determines that the voice input represents a request for an individual one of the one or more voice-enabled functionalities associated with the location value assigned to the device account corresponding to the voice-capturing device; and
    invoking the individual one of the one or more voice-enabled functionalities based at least in part on the voice input analysis.

16. The non-transitory computer-readable storage medium as recited in claim 14, wherein the program instructions are further computer-executable to perform:
    receiving voice input from the voice-capturing device at the service provider environment;
    performing voice input analysis on the voice input in the service provider environment, wherein the voice input analysis determines that the voice input represents a request for an additional voice-enabled functionality not associated with the location value assigned to the device account corresponding to the voice-capturing device; and
    denying the request for the additional voice-enabled functionality.

17. The non-transitory computer-readable storage medium as recited in claim 14, wherein the program instructions are further computer-executable to perform:
    generating a modified profile for the location value, wherein the modified profile indicates a modified set of one or more voice-enabled functionalities of the service provider environment; and
    based at least in part on the assignment of the location value to the device account and on the modified profile, enabling the modified set of one or more voice-enabled functionalities for use by the voice-capturing device.

18. The non-transitory computer-readable storage medium as recited in claim 14, wherein the program instructions are further computer-executable to perform:
    storing a modification to the one or more voice-enabled functionalities associated with the location value;
    determining a set of voice-capturing devices affected by the modification, wherein the set of voice-capturing devices includes the device;
    determining the desired state of the set of voice-capturing devices in a data store maintained by the device management component; and
    adjusting an actual state in the service provider environment to the desired state for one or more of the set of voice-capturing devices.

19. The non-transitory computer-readable storage medium as recited in claim 14, wherein the one or more voice-enabled functionalities are associated with the location value based at least in part on evaluation of one or more criteria associated with the location value.

20. The non-transitory computer-readable storage medium as recited in claim 14, wherein the one or more voice-enabled functionalities associated with the location value comprise a user-specific functionality, and wherein the program instructions are further computer-executable to perform:
    receiving voice input from the voice-capturing device at the service provider environment;
    performing voice input analysis on the voice input in the service provider environment, wherein the voice input analysis determines that the voice input represents a request for the user-specific functionality;
    verifying that the voice input is associated with a user authorized to access the user-specific functionality; and
    invoking the user-specific functionality based at least in part on the verifying.

* * * * *

UNITED STATES PATENT AND TRADEMARK OFFICE
CERTIFICATE OF CORRECTION

| | | |
|---|---|---|
| PATENT NO. | : 10,972,556 B1 | |
| APPLICATION NO. | : 15/466736 | |
| DATED | : April 6, 2021 | |
| INVENTOR(S) | : Yu-Hsiang Cheng et al. | |

It is certified that error appears in the above-identified patent and that said Letters Patent is hereby corrected as shown below:

In the Claims

Column 19, Lines 56 and 57, In Claim 5, delete "the one or more voice-enabled functionalities" and insert --the one or more functionalities--, therefor.

Signed and Sealed this
Twenty-first Day of February, 2023

Katherine Kelly Vidal
*Director of the United States Patent and Trademark Office*